Sept. 13, 1960      R. L. HOFFMAN      2,952,352
CUP CONVEYOR
Filed July 20, 1959      3 Sheets-Sheet 1
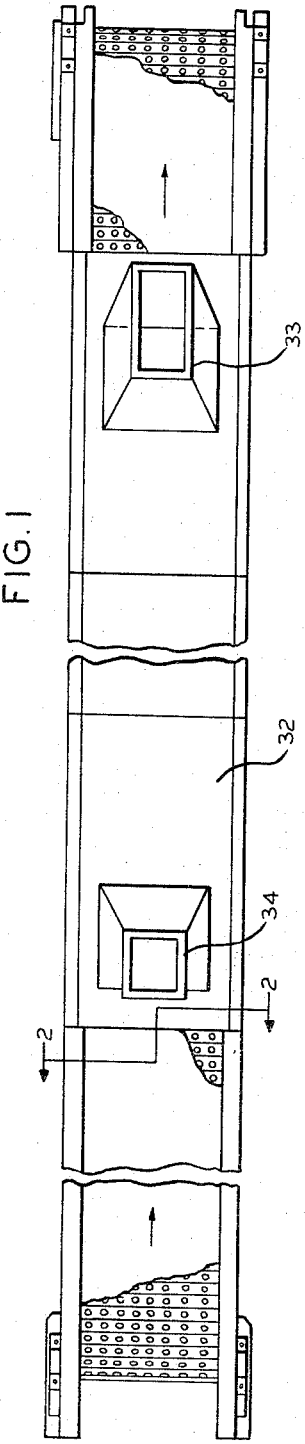
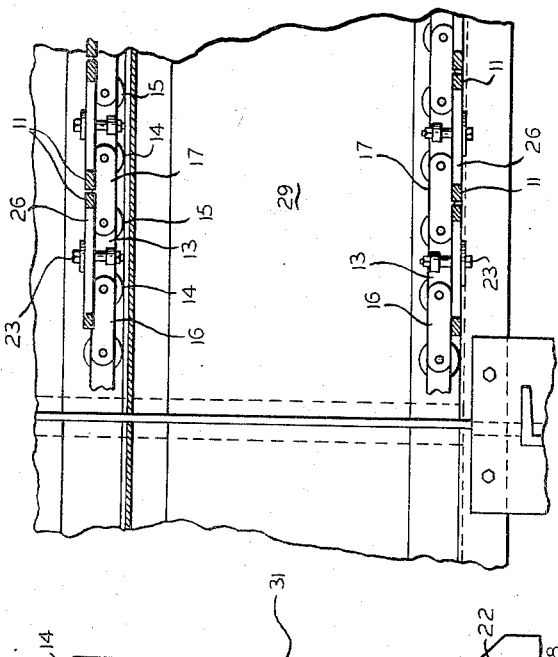
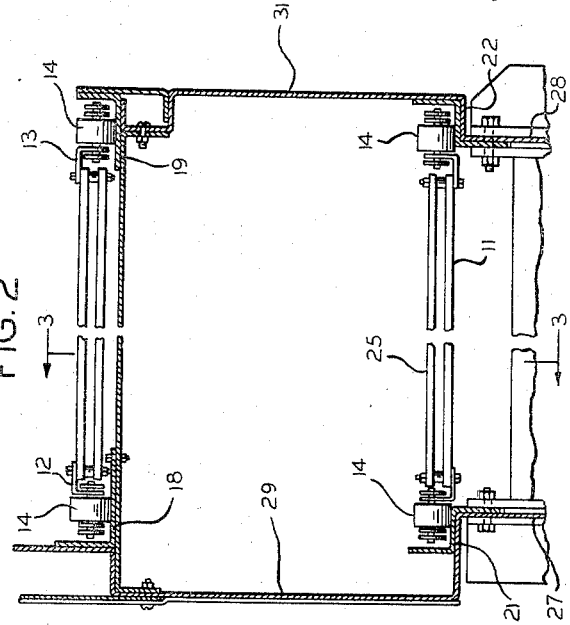
INVENTOR.
RICHARD L. HOFFMAN
BY Frank J. Foley
ATTORNEY Sept. 13, 1960    R. L. HOFFMAN    2,952,352
CUP CONVEYOR Filed July 20, 1959    3 Sheets-Sheet 2

*INVENTOR.*
RICHARD L. HOFFMAN
BY
Frank Stoley
ATTORNEY

Sept. 13, 1960     R. L. HOFFMAN     2,952,352
CUP CONVEYOR

Filed July 20, 1959     3 Sheets-Sheet 3

INVENTOR.
RICHARD L. HOFFMAN
BY Frank J. Stoles
ATTORNEY

United States Patent Office 2,952,352
Patented Sept. 13, 1960

2,952,352

CUP CONVEYOR

Richard L. Hoffman, Los Angeles, Calif., assignor to Hoffman Candy Company, Los Angeles, Calif., a corporation of California Filed July 20, 1959, Ser. No. 828,352

6 Claims. (Cl. 198—185)

This invention relates to improvements in conveyor systems having endless conveyors which are adapted to receive and carry a large number of cups into which some material is to be deposited while the cups are on the conveyor. Subsequently the cups may be subjected to a treatment, if desired, but eventually the cups are automatically ejected from the conveyor.

While this invention is suitable for adaptation to a number of uses, a particular use will be described herein, to illustrate the nature and the manner of use of the invention. As a specific example, the cups, which may be crinkled glassine cups, are placed on the conveyor by some means not forming a part of this invention, and as the conveyor moves them along, they receive molten or semi-liquid confections which will be solidified as the conveyor carries the filled cups through a cooling zone. After emerging from the cooling zone, the cups are then ready to be ejected, and as the endless conveyor belt moves around the ejector end of its path, the individual cups are ejected from the conveyor and allowed to slide onto another belt.

The principal object of the invention is to provide an endless conveyor having slots and means for receiving and conveying the cups prior to filling, during the filling operation, during the subsequent cooling operation, and finally to the cup ejection position.

Another object of the invention is to provide an endless conveyor adapted for performing the foregoing functions and provided further with equipment for ejecting the cups from the conveyor for transfer to some other apparatus.

Another object of the invention is to provide a conveyor system having all of the foregoing advantages and embodied in apparatus which is economical to manufacture, operate and maintain.

Other objects and advantages of the invention will be mentioned hereinafter or will become apparent upon a perusal of the following specification, in which a preferred embodiment of the invention is described and illustrated.

In the drawings,

Figure 1 is a top plan view of the complete conveyor system.

Figure 2 is a vertical cross section through a portion of the apparatus on the broken line 2—2 of Figure 1.

Figure 3 is a sectional view on the line 3—3 of Figure 2.

Figure 4:
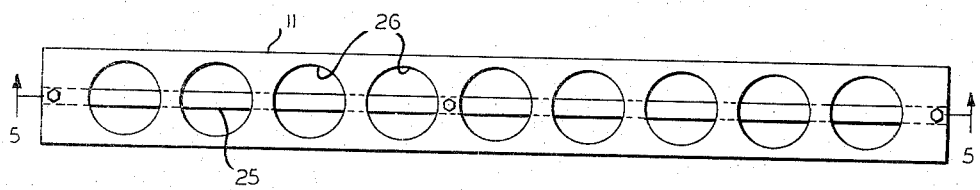
Figure 4 is a top plan view of a slat perforated to receive the cups, and showing a bar below the perforations for supporting the cups.
Figure 5:
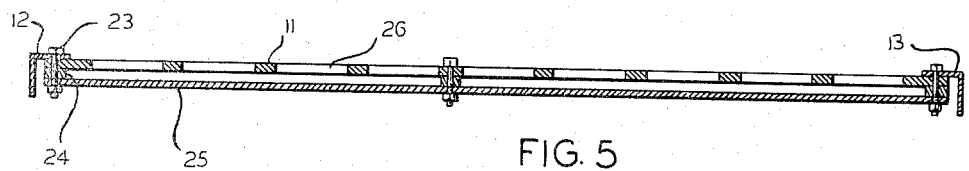
Figure 5 is a central vertical sectional view on the line 5—5 of Figure 4.
Figure 6:
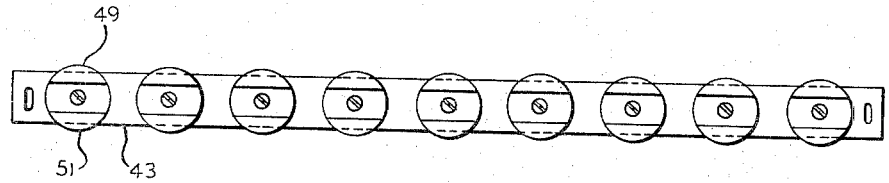
Figure 6 is a top plan view of one row of ejector elements.
Figure 7:
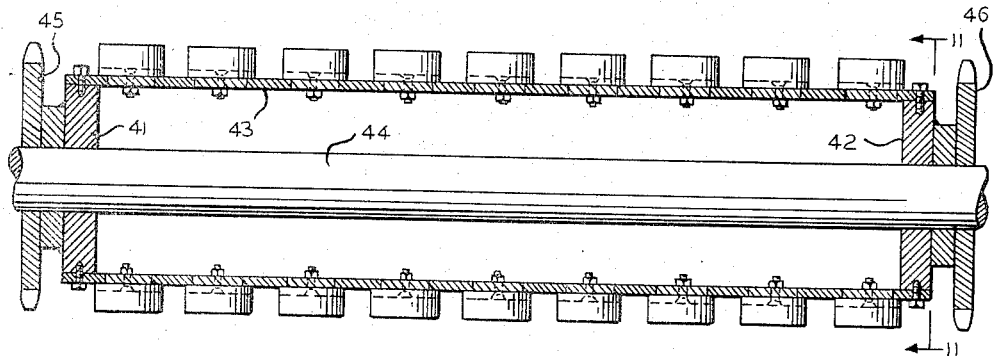
Figure 7 is a vertical sectional view through the ejector roll.

Referring further to the drawings, the endless conveyor is mounted on a suitable supporting frame, but all the details of construction of the supporting frame are not shown as they do not constitute a part of this invention. The endless conveyor itself consists of a plurality of rigid perforated cup retaining members, or slats, such as 11, extending transversely of the conveyor. Each such member is provided at its opposite ends with angular brackets 12 and 13 bolted thereto and to each of these brackets are pivotally connected a pair of rollers such as 14 and 15. Each pair of rollers 14 and 15 connected to each cup retaining member are pivotally linked to the rollers of adjoining cup retaining members by means of the links 16 and 17, whereby all of the cup retaining members are thus formed into a continuous conveyor belt. The rollers along the upper reach of the conveyor ride on angular tracks 18 and 19, whereas the rollers on the lower reach of the conveyor ride on the angular tracks 21 and 22, all of which tracks are suitably supported on the conveyor structure as shown or in any other appropriate manner.

Mounted integrally with each transverse cup retaining member, by means of bolts 23 and spacing washers 24, is a narrow bar 25 positioned a suitable distance below the member 11 to support the bottoms of the cups at such a level that their sides are lightly retained peripherally in the perforations 26 of the cup retaining members at a desired predetermined level. Thus, cups having vertical side walls or slightly outwardly flaring side walls may be transported in this conveyor and ejected without having to overcome any substantial friction.

As illustrated, the lower tracks of the conveyor system may be supported on the frame members 27 and 28 and the upper tracks supported on steel side walls 29 and 31, as shown in Figure 2. When this apparatus is used for depositing in the cups a warm molten mass of candy or other confection, it is desirable, after the cups are filled, to move them through a cooling zone for solidifying their contents. For this purpose, Figure 1 shows, but not in detail, a hood generally indicated as 32 which surmounts the upper reach of the conveyor and which should be appropriately insulated on its side walls and top wall. An inlet duct 33 for introducing cold air and an outlet duct 34 for the used air may be provided as shown, and any refrigeration means or air cooling means may be provided for cooling such air. The details of the structure of the cooling hood do not form a part of this invention, hence are not shown.

As the apparatus for placing the cups in the conveyor perforations and the equipment for filling the cups with a molten mixture do not form a part of this invention, they are not shown.

Figure 8:
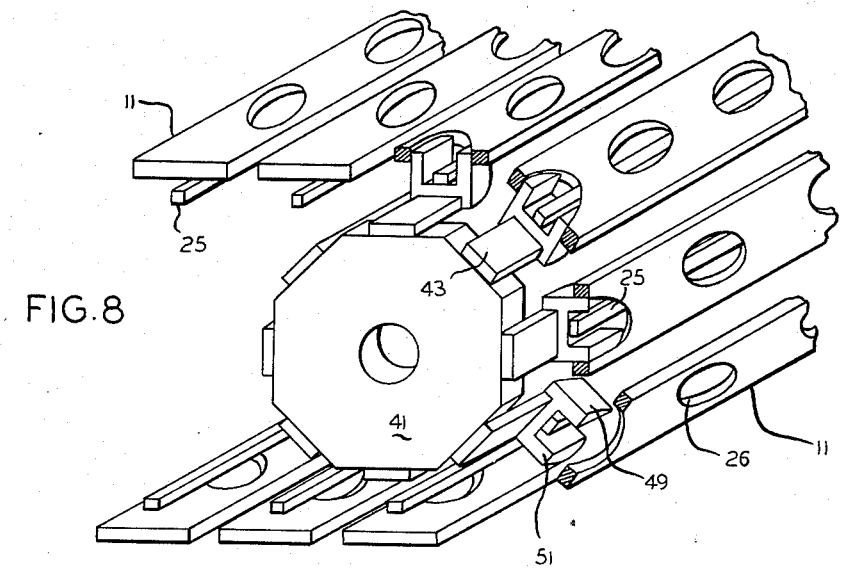
Figure 8 is a perspective view of a portion of the conveyor showing the ejector elements entering and leaving the slat perforations.

After the cups have moved through the cooling zone and their contents adequately solidified, they move to the ejection, or unloading, position, where an ejection roll is mounted between the upper and lower reaches of the conveyor belt and is synchronized to rotate therewith. This roll is shown partially schematically in Figure 8, and consists of a pair of opposite end plates such as 41 and 42, which are connected together by means of rigid bars 43, this structure being keyed or otherwise fixed on a shaft 44 which has keyed thereto sprockets 45 and 46 which engage the rollers such as 14 and 15 as the conveyor belt moves around the unloading or ejector position. Suitable motor-driven means, not shown, secured to the shaft 44, are provided for causing this ejector roll to rotate and simultaneously drive the conveyor belt. Preferably, a suitable drive for the conveyor belt is provided at the loading end of the looped conveyor belt, for the sake of efficient operation.

Figures 9, 11:
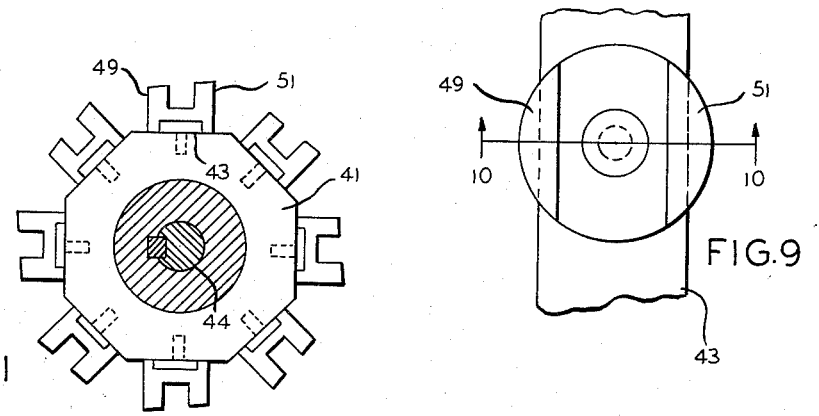
Figure 9 is a top plan view of a single ejector element.
Figure 11 is a vertical sectional view on the line 11—11 of Figure 7.
Figure 12:
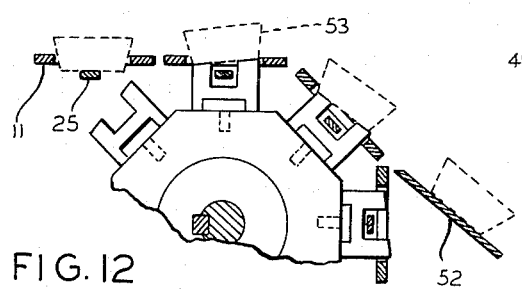
Figure 12 is a view taken at the position of the line 11—11 of Figure 7 showing schematically the manner in which cups are ejected from the conveyor by the ejection roll.
Figure 10:
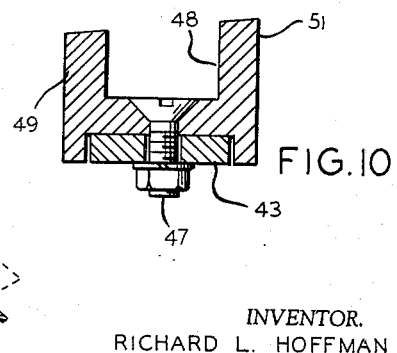
Figure 10 is a vertical sectional view on the line 10—10 of Figure 9.

Straddling the transverse bars 43 and bolted thereto by the bolts 47 are the individual ejector elements, each positioned for registration at the correct time with a perforation such as 26 in the cup retaining member. As shown in Figures 9 and 10, the outwardly extending portion of each ejector member is bifurcated by means of a slot 48 wide enough to loosely embrace or straddle the cup supporting bar 25, so that as the ejectors are rotated into registration with the perforations 26 the bifurcations 49 and 51 may extend past the bars 25 to engage the bottoms of the confection cups and raise them out of the perforations 26, after which the cups may then slide downwardly over a deflecting plate 52, as shown in Figure 12, for delivery to another belt to be transported to the next operation.

In the operation of the apparatus, cups are placed in each of the perforations 26 as each cup retaining member approaches the cup loading position (not shown). A warm molten confection is then injected into each cup and during this operation the cup, which may be crinkled or corrugated glassine cup, or made of other suitable material, is peripherally retained by the upper cup retaining member and vertically supported by the underlying transversely extending bar 25. The cups are then conveyed through the cooling zone under the hood, their contents are solidified, and they are then delivered to the ejection position. As the conveyor belt moves around the ejection roll, concentrically therewith, the ejectors become rotated upwardly against the cup bottoms and eject them from the cup retaining members, thence to slide downwardly over a deflecting plate 52.

It should be noted that a considerable area of the ejector is brought into contact with each cup bottom, which should free each cup without damage thereto even if it be somewhat stuck, due to some inadvertence. Also, the rocking lift is advantageous in such cases.

While shallow cups of horizontal circular cross section are shown, it is evident that cups of other shapes and dimensions may be used, and the apparatus may readily be dimensioned and shaped for such other uses. Also, instead of cooling, the contents of the cup could be heated—baked, for example, by passage through an oven.

It will be perceived that the conveyor and ejector apparatus described above is simple and rugged, readily kept clean, and excellently suited for the processing of molten confections which are to be solidified, or frozen if desired, and equally suitable for the processing of cups containing other materials which may not be confections.

While a specific embodiment of the invention has been shown and described herein, it should be understood that the details of construction of the apparatus are subject to considerable variation and modification without departing from the scope of the invention defined in the appended claims.

Having shown and described my invention, I claim:

1. In a cup conveyor system, an endless conveyor having interconnected cup retaining members extending transversely across the conveyor, each member having a plurality of perforations therethrough adapted for peripherally engaging and retaining the cups, a bar mounted integrally with and spaced below each member adapted for vertically supporting the retained cups, the width of each bar being substantially less than the diameter of said perforations, and an ejector roll rotatably mounted between the upper and lower reaches of the conveyor adjoining the unloading end thereof having rows of bifurcated ejector elements mounted thereon spaced for registration with said perforations, the bifurcated ends of the ejector elements being adapted to straddle said bar and project into said perforations, simultaneously lifting the retained cups out of said perforations as the conveyor rotates around the ejector roll.

2. In a cup conveyor system, an endless conveyor having rigid cup retaining members extending transversely across the conveyor, each member having a plurality of perforations therethrough adapted for peripherally engaging and retaining the cups, a bar mounted integrally with and spaced below each member adapted for vertically supporting the retained cups, the width of each bar being substantially less than the diameter of said perforations, conveyor rollers pivotally connected to opposite ends of said members, tracks for supporting said rollers, links connecting the rollers of adjoining members adapted to form the members into a continuous conveyor belt, and an ejector roll rotatably mounted between the upper and lower reaches of the conveyor adjoining the unloading end thereof having rows of bifurcated ejector elements mounted thereon spaced for registration with said perforations, the bifurcated ends of the ejector elements being adapted to straddle said bar and project into said perforations, simultaneously lifting the retained cups out of said perforations as the conveyor rotates around the ejector roll.

3. In a cup conveyor system, an endless conveyor having rigid cup retaining members extending transversely across the conveyor, each member having a plurality of perforations therethrough adapted for peripherally engaging and retaining the cups, a bar mounted integrally with and spaced below each member adapted for vertically supporting the retained cups, the width of each bar being substantially less than the diameter of said perforations, conveyor rollers pivotally connected to opposite ends of said members, tracks for supporting said rollers, links connecting the rollers of adjoining members adapted to form the members into a continuous conveyor belt, an ejector roll rotatably mounted between the upper and lower reaches of the conveyor adjoining the unloading end thereof having rows of bifurcated ejector elements mounted thereon spaced for registration with said perforations, the bifurcated ends of the ejector elements being adapted to straddle said bar and project into said perforations, simultaneously lifting the retained cups out of said perforations as the conveyor rotates around the ejector roll, and sprockets on opposite ends of the ejector roll axis engaging said rollers adapted for carrying the conveyor belt around the roll concentrically therewith.

4. In a cup conveyor system, an endless conveyor having interconnected cup retaining members extending transversely across the conveyor, each member having a plurality of perforations therethrough adapted for peripherally engaging and retaining the cups, a bar mounted integrally with and spaced below each member adapted for vertically supporting the retained cups, the width of each bar being substantially less than the diameter of said perforations, and cup ejector means positioned between the upper and lower reaches of the conveyor adjoining its unloading position including bifurcated ejector elements shaped for straddling said bars and spaced apart transversely of the conveyor for timed registration with said perforations including means for projecting said elements into said perforations thereby ejecting the cups from the conveyor.

5. In a cup conveyor system, an endless conveyor having rigid cup retaining members extending transversely across the conveyor, said members having means adapted for peripherally engaging an upper portion of the cups, a bar mounted integrally with and spaced below each member adapted for vertically supporting the retained cups, the width of each bar being substantially less than the diameter of said cups, conveyor rollers pivotally connected to opposite ends of said members, tracks for supporting said rollers, links connecting the rollers of adjoining members adapted to form the members into a continuous conveyor belt, an ejector roll rotatably mounted between the upper and lower reaches of the conveyor adjoining the unloading end thereof having rows of bifurcated ejector elements mounted thereon spaced for registration with said cups, the bifurcated ends of the ejector elements being adapted to straddle said bar and lift the retained cups out of said retaining members as the conveyor rotates around the ejector roll, and sprockets on opposite ends of the ejector roll axis engaging said rollers adapted for carrying the conveyor belt around the roll concentrically therewith.

6. In a cup conveyor system, an endless conveyor having rigid cup retaining members extending transversely across the conveyor, said members having means adapted for peripherally engaging an upper portion of the cups, means mounted separately and spaced below each member vertically supporting a portion of the bottom of each cup, conveyor rollers pivotally connected to opposite ends of said members, tracks for supporting said rollers, links connecting the rollers of adjoining members adapted to form the members into a continuous conveyor belt, an ejector roll rotatably mounted between the upper and lower reaches of the conveyor adjoining the unloading end thereof having rows of ejector elements mounted thereon spaced for registration with the cup bottoms adapted to contact the unsupported areas of the cup bottoms and lift the retained cups out of said retaining members as the conveyor rotates around the ejector roll, and sprockets on opposite ends of the ejector roll axis engaging said rollers adapted for carrying the conveyor belt around the roll concentrically therewith.

References Cited in the file of this patent
UNITED STATES PATENTS

| | | |
|---|---|---|
| 2,462,276 | Mueller | Feb. 22, 1949 |
| 2,724,485 | Reading | Nov. 22, 1955 |
| 2,880,850 | Keathley | Apr. 7, 1959 |